United States Patent
Miyairi et al.

(10) Patent No.: US 11,614,011 B2
(45) Date of Patent: Mar. 28, 2023

(54) PILLAR SHAPED HONEYCOMB STRUCTURE, EXHAUST GAS PURIFYING DEVICE, EXHAUST SYSTEM, AND METHOD FOR PRODUCING HONEYCOMB STRUCTURE

(71) Applicant: NGK INSULATORS, LTD., Nagoya (JP)

(72) Inventors: Yukio Miyairi, Nagoya (JP); Takehide Shimoda, Nagoya (JP); Takashi Aoki, Nagoya (JP); Hirofumi Sakamoto, Nagoya (JP); Masaaki Masuda, Nagoya (JP); Atsuo Kondo, Nagoya (JP); Yunie Izumi, Nagoya (JP); Kyohei Kato, Nagoya (JP); Norihiro Wakita, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 17/136,420

(22) Filed: Dec. 29, 2020

(65) Prior Publication Data

US 2021/0115825 A1    Apr. 22, 2021

Related U.S. Application Data

(63) Continuation of application No. PCT/JP2019/016520, filed on Apr. 17, 2019.

(30) Foreign Application Priority Data

Aug. 10, 2018  (JP) .............................. JP2018-151973
Aug. 10, 2018  (JP) .............................. JP2018-151974
(Continued)

(51) Int. Cl.
*F01N 3/22*    (2006.01)
*F01N 3/022*   (2006.01)
(Continued)

(52) U.S. Cl.
CPC ....... *F01N 3/0222* (2013.01); *B01D 46/2429* (2013.01); *B01D 46/2474* (2013.01);
(Continued)

(58) Field of Classification Search
CPC .. F01N 3/0222; F01N 3/2828; F01N 2330/06; F01N 3/0335; F01N 3/035;
(Continued)

(56) References Cited

U.S. PATENT DOCUMENTS 7,981,375 B2 *  7/2011  Ramberg .............. F02D 41/027
                                                            264/630
2003/0086839 A1 *  5/2003  Rivin ................ H01M 8/04225
                                                          422/186.01
(Continued)

FOREIGN PATENT DOCUMENTS

JP    H11-336534 A1   12/1999
JP    2005-207331 A1   8/2005
(Continued)

OTHER PUBLICATIONS

International Search Report and Written Opinion (Application No. PCT/JP2019/016520) dated Jul. 23, 2019.
(Continued)

*Primary Examiner* — Tom P Duong
(74) *Attorney, Agent, or Firm* — Burr Patent Law, PLLC

(57) ABSTRACT

A pillar shaped honeycomb structure includes: a porous partition wall that defines a plurality of cells, the cells forming flow paths for a fluid, the cells extending from an inflow end face to an outflow end face; and an outer peripheral wall located at the outermost circumference. At least a part of surfaces of the partition walls has a surface layer, and the surface layer includes magnetic particles and has permeability.

25 Claims, 7 Drawing Sheets

(30) Foreign Application Priority Data

Dec. 7, 2018 (JP) .............................. JP2018-230370
Feb. 8, 2019 (JP) .............................. JP2019-022106

(51) Int. Cl.
*B01D 46/24* (2006.01)
*F01N 3/28* (2006.01)

(52) U.S. Cl.
CPC ..... *B01D 46/2476* (2021.08); *B01D 46/2482* (2021.08); *B01D 46/24491* (2021.08); *B01D 46/24492* (2021.08); *B01D 46/24494* (2021.08); *F01N 3/2828* (2013.01); *B01D 2255/9155* (2013.01); *F01N 2330/06* (2013.01)

(58) Field of Classification Search
CPC ............... F01N 3/2885; F01N 2230/02; B01D 2255/9155; B01D 46/2422; B01D 46/24491
USPC .......................................................... 55/523
See application file for complete search history.

(56) References Cited

U.S. PATENT DOCUMENTS

| | | |
|---|---|---|
| 2005/0196586 A1 | 9/2005 | Shimodaira et al. |
| 2010/0135866 A1 | 6/2010 | Mizuno et al. |
| 2011/0203242 A1 | 8/2011 | Goto et al. |
| 2011/0262639 A1 | 10/2011 | Sato et al. |
| 2015/0152768 A1* | 6/2015 | Arulraj .................... B01J 29/18 428/117 |
| 2017/0022868 A1 | 1/2017 | Crawford et al. |
| 2017/0276280 A1* | 9/2017 | Kobayashi .............. F16L 41/02 |
| 2019/0070596 A1* | 3/2019 | Yang .................. B01D 53/9436 |

FOREIGN PATENT DOCUMENTS

| | | |
|---|---|---|
| JP | 2005-247605 A1 | 9/2005 |
| JP | 2006-057584 A1 | 3/2006 |
| JP | 2011-224514 A1 | 11/2011 |
| JP | 4920752 B2 | 4/2012 |
| JP | 5261256 B2 | 8/2013 |
| JP | 5616059 B2 | 10/2014 |
| WO | 2016/021186 A1 | 2/2016 |

OTHER PUBLICATIONS

English translation of the International Preliminary Report on Patentability (Chapter I)(Application No. PCT/JP2019/016520) dated Feb. 25, 2021.
Chinese Office Action (with English translation), Chinese Application No. 201980039861.1, dated Aug. 24, 2022 (17 pages).
"100 Award-Winning New Products in the United States, 1979" Shanghai Science and Technology Literature Press, edited by Shanghai Science and Technology Literature Press, p. 89.

* cited by examiner

PILLAR SHAPED HONEYCOMB STRUCTURE, EXHAUST GAS PURIFYING DEVICE, EXHAUST SYSTEM, AND METHOD FOR PRODUCING HONEYCOMB STRUCTURE

FIELD OF THE INVENTION

The present invention relates to a pillar shaped honeycomb structure, an exhaust gas purifying device, an exhaust system, and a method for producing the honeycomb structure. More particularly, it relates to a pillar shaped honeycomb structure, an exhaust gas purifying device, an exhaust system, and a method for producing the honeycomb structure, which are possible to burn and remove carbon fine particles by electric heating, and which are also usable even at a position where condensed water is generated, and which have no problem of short circuit due to condensed water and carbon deposition, and which have low pressure loss.

BACKGROUND OF THE INVENTION

Exhaust gases from motor vehicles typically contain fine particles of carbon or the like as a result of incomplete combustion. From the viewpoint of reducing health hazards to a human body, there is an increasing need for reducing fine particles in exhaust gases from motor vehicles. At the present time, the reduction of fine particles in the emission extremely close to zero is also required for fine particles emitted from gasoline engines which are the mainstream of power sources for motor vehicles. There is also the same need for fine particles in exhaust gases from diesel engines.

In order to satisfy such needs, Patent Literature 1 proposes a honeycomb structure including: a honeycomb structure portion having porous partition walls that define a plurality of cells serving as fluid flow paths, and an outer peripheral wall positioned at the outermost circumference; and plugged portion arranged at opening portions of the cells at an end face on an inlet side of the fluid and at remaining opening portions of the cells at an end face on an exit side of the fluid in the honeycomb structure portion. Further, Patent Literature 2 proposes that surface layers are provided on surfaces of partition walls of a honeycomb filter to solve problems such as pressure loss during PM deposition.

When mounting the above filter on a vehicle, it is preferable to mount the filter at an underfloor position having a relatively large space from the viewpoint of ensuring a mounting space, in terms of ensuring a degree of freedom in a design for forming an exhaust system. However, if it is placed at the underfloor position, a temperature of an exhaust gas from an engine is decreased, the combustion of fine particles (carbon fine particles) accumulated in the filter does not proceed, and the carbon fine particles are accumulated, which cause a problem of causing an excessive increase in pressure loss to decrease an engine output. In order to avoid this, as disclosed in Patent Literature 3, a method has been proposed in which an electric current is passed through a conductive honeycomb structure itself and the honeycomb structure itself is heated by the Joule heat. Further, as a heating technique that can be used in an environment where condensed water is generated and can be used even under conditions where carbon fine particles are deposited, Patent Literature 4 discloses a method of induction heating by means of a coil configured to insert a metal wire into non-conductive honeycomb cells to go around an outer peripheral surface of a honeycomb structure, without passing electric current through the honeycomb structure itself.

CITATION LIST

Patent Literatures

[Patent Literature 1] Japanese Patent No. 4920752 B
[Patent Literature 2] Japanese Patent No. 5616059 B
[Patent Literature 3] Japanese Patent No. 5261256 B
[Patent Literature 4] U.S. Patent Application Publication No. 2017/0022868 A1

SUMMARY OF THE INVENTION

As a result of studies, the present inventors have found that, in the technique disclosed in Patent Literature 3, electricity is conducted through the honeycomb structure, therefore, electric short circuit is generated when condensed water is generated in the exhaust gas in the exhaust gas pipe. Also, they have found that the technique causes a problem of electrical short circuit due to accumulation of carbon fine particles.

Further, they found that when the technique disclosed in Patent Literature 4 is applied to a honeycomb structure filter, some cells cannot be used as gas flow paths, and a filtration area of the filter is decreased, which may cause a significant increase in pressure loss.

The present invention has been made in view of the above problems. An object of the present invention is to provide a honeycomb structure and an exhaust gas purifying device, which are capable of combustion removal of carbon fine particles by electric heating, and which can also be used even at a position where condensed water is generated, and which have no problem of the short circuit due to condensed water or carbon deposition and have lower pressure loss. Also, an object of the present invention is to provide a method for producing a honeycomb structure.

As a result of intensive studies, the present inventors have found that the above problems can be solved by providing a surface layer containing magnetic particles and having permeability in at least a part of surfaces of the partition walls of the honeycomb structure. Thus, the present invention is specified as follows.

(1)
A pillar shaped honeycomb structure, comprising:
a porous partition wall that defines a plurality of cells, the cells forming flow paths for a fluid, the cells extending from an inflow end face that is an end face on an inflow side of the fluid to an outflow end face that is an end face on an outflow side of the fluid; and
an outer peripheral wall located at the outermost circumference;
wherein at least a part of surfaces of the partition walls has a surface layer, and wherein the surface layer comprises magnetic particles and has permeability.

(2)
A pillar shaped honeycomb structure, comprising:
a porous partition wall that defines a plurality of cells, the cells forming flow paths for a fluid, the cells extending from an inflow end face that is an end face on an inflow side of the fluid to an outflow end face that is an end face on an outflow side of the fluid; and
an outer peripheral wall located at the outermost circumference;

wherein at least a part of surfaces of the partition walls has a surface layer, and wherein the surface layer comprises needle-shaped or scale-shaped magnetic particles.

(3)

An exhaust gas purifying device, comprising:

the pillar shaped honeycomb structure according to (1) or (2);

a coil wiring that spirally surrounds an outer circumference of the pillar shaped honeycomb structure; and a fixing member for fixing the coil wiring to an interior of an exhaust gas flow path, the fixing member being positioned outside the coil wiring.

(4)

An exhaust system, comprising: an exhaust muffler; the exhaust gas purifying device according to (3), the exhaust gas purifying device being provided in the exhaust muffler; and a silencer provided in the exhaust muffler.

(5)

A method for producing a pillar shaped honeycomb structure, comprising:

porous partition walls that define a plurality of cells, the cells forming flow paths for a fluid, the cells extending from an inflow end face that is an end face on an inflow side of the fluid to an outflow end face that is an end face on an outflow side of the fluid; and an outer peripheral wall located at the outermost circumference, wherein the method comprises a step of forming a surface layer in at least a part of surfaces of the partition walls, the surface layer comprising magnetic particles and having permeability.

According to the present invention, it is possible to provide a honeycomb structure and an exhaust gas purifying device, which are capable of combustion removal of carbon fine particles by electric heating, and which can also be used even at a position where condensed water is generated, and which have no problem of the short circuit due to condensed water or carbon deposition and have lower pressure loss. Also, according to the present invention, it is possible to provide a method for producing the honeycomb structure as described above.

DETAILED DESCRIPTION OF THE INVENTION

Figure 1:
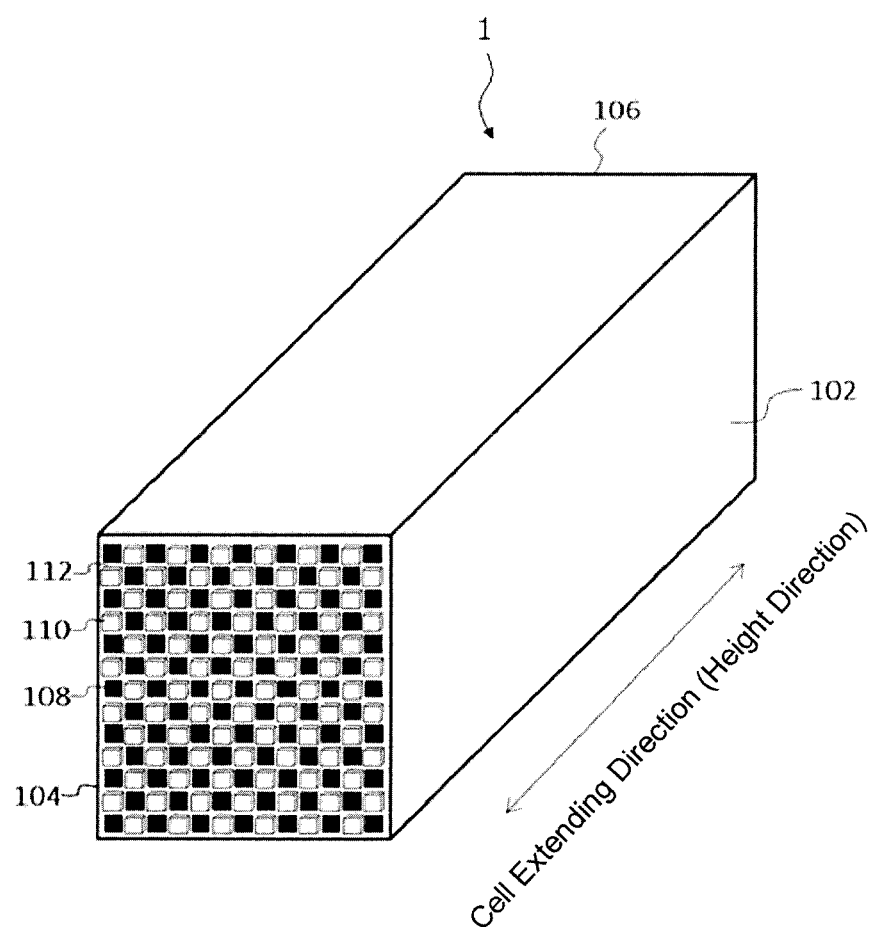
FIG. 1 is a perspective view schematically illustrating a honeycomb structure according to an embodiment of the present invention.

Hereinafter, embodiments of a honeycomb structure according to the present invention will be described with reference to the drawing. However, the present invention is not limited to these embodiments, and various changes, modifications, and improvements may be made based on knowledge of those skilled in the art, without departing from the scope of the present invention.

(1. Honeycomb Structure)

FIG. 1 shows a perspective view schematically illustrating a honeycomb structure according to an embodiment of the present invention. A honeycomb structure 1 illustrated includes: an outer peripheral wall 102 located at the outermost circumference; and a plurality of cells disposed inside the outer peripheral wall 102, the cells extending in parallel between a first end face 104 (an inflow end face, which is the end face on an inflow side of a fluid) and a second end face 106 (an outflow end face, which is the end face on an outflow side of the fluid), in which, in FIG. 1, the plurality of cells include: a plurality of first cells 108 having plugged portions where the first end face 104 is opened to protrude to the second end face 106; and a plurality of second cells 110 having plugged portions protruding to the first end face 104, where the second end face 106 is opened. Each of the cells forms a fluid flow path in the honeycomb structure 1. Further, in the illustrated honeycomb structure 1, porous partition walls 112 for defining the first cells 108 and the second cells 110 are provided, and each first cell 108 and each second cell 110 are alternately arranged across each partition wall 112, and each of the end faces form a checkered pattern. In the honeycomb structure according to the illustrated embodiment, all the first cells 108 are adjacent to the second cells 110, and all the second cells 110 are adjacent to the first cells 108. However, the cells do not necessarily have the plugged portions. Further, all of the first cells 108 may not be necessarily adjacent to the second cells 110, and all of the second cells 110 may not be necessarily adjacent to the first cells 108. The numbers, arrangements, shapes and the like of the cells 108 and 110, as well as the thickness of the partition wall 112, and the like, are not limited, and may be appropriately designed as needed.

Although a material of the honeycomb structure is not particularly limited, the honeycomb structure is required to be a porous body having a large number of pores. Therefore, the honeycomb structure is typically formed of a ceramic material, including a sintered body of ceramics comprised of cordierite, silicon carbide, aluminum titanate, silicon nitride, mullite, alumina, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure contains silicon carbide in an amount of 50% by mass or more of the entire honeycomb structure. The phrase "the honeycomb structure is mainly based on a silicon-silicon carbide composite material" means that the honeycomb structure contains 90% by mass or more of the silicon-silicon carbide composite material (total mass) based on the entire honeycomb structure. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure is mainly based on silicon carbide" means that the honeycomb structure contains 90% by mass or more of silicon carbide (total mass) based on the entire honeycomb structure.

Preferably, the honeycomb structure is formed of at least one ceramic material selected from the group consisting of cordierite, silicon carbide, aluminum titanate, silicon nitride, mullite, and alumina.

The cell shape of the honeycomb structure may be, but not particularly limited to, a polygonal shape such as a triangle, a quadrangle, a pentagon, a hexagon and an octagon; a circular shape; or an ellipse shape, in a cross section orthogonal to the central axis.

Further, an outer shape of the honeycomb structure may be, but not particularly limited to, a shape such as a pillar shape with circular end faces (circular pillar shape), a pillar shape with oval end faces, and a pillar shape with polygonal (square, pentagonal, hexagonal, heptagonal, octagonal, and the like) end faces, and the like. Furthermore, the size of the honeycomb structure is not particularly limited, and an axial length of the honeycomb structure is preferably from 40 to 500 mm. Further, for example, when the outer shape of the honeycomb structure is cylindrical, a radius of each end face is preferably from 50 to 500 mm.

Each partition wall of the honeycomb structure preferably has a thickness of from 0.20 to 0.50 mm, and more preferably from 0.25 to 0.45 mm, in terms of ease of production. For example, the thickness of 0.20 mm or more improves the strength of the honeycomb structure. The thickness of 0.50 mm or less can result in lower pressure loss when the honeycomb structure is used as a filter. It should be noted that the thickness of the partition wall is an average value measured by a method for observing the axial cross section with a microscope.

Further, each partition wall forming the honeycomb structure preferably has a porosity of from 30 to 70%, and more preferably from 40 to 65%, in terms of ease of production. The porosity of 30% or more tends to decrease a pressure loss. The porosity of 70% or less can maintain the strength of the honeycomb structure.

The porous partition walls preferably have an average pore size of from 5 to 30 µm, and more preferably from 10 to 25 µm. The average pore size of 5 µm or more can decrease the pressure loss when the honeycomb structure is used as a filter. The average pore size of 30 µm or less can maintain the strength of the honeycomb structure. As used herein, the terms "average pore diameter" and "porosity" mean an average pore diameter and a porosity measured by mercury porosimetry, respectively.

The honeycomb structure preferably has a cell density in a range of from 5 to 63 cells/cm$^2$, and more preferably in a range of from 31 to 54 cells/cm$^2$, although not particularly limited thereto.

Such a honeycomb structure is produced by forming a green body containing a ceramic raw material into a honeycomb shape having partition walls that penetrate from one end face to other end face and define a plurality of cells to form flow paths for a fluid, to form a honeycomb formed body, and drying the honeycomb formed body and then firing it. When such a honeycomb structure is used as the honeycomb structure according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference, whereas in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure is not limited to an integral type honeycomb structure in which the partition walls are integrally formed. For example, although not shown in the drawing, the honeycomb structure may be a honeycomb structure in which pillar shaped honeycomb segments each having a plurality of cells defined by porous partition walls to form flow paths for a fluid are combined via joining material layers (which, hereinafter, may be referred to as a "joined honeycomb structure").

Further, the honeycomb structure may be a honeycomb structure in which one open ends of predetermined cells among the plurality of cells and other open ends of the remaining cells are plugged by plugged portions. Such a honeycomb structure can be used as a filter (honeycomb filter) for purifying an exhaust gas. It should be noted that such plugged portions may be arranged after the outer peripheral coating is formed or in a state before the outer peripheral coating is formed, i.e., in a stage of producing the honeycomb structure.

The plugged portions that can be used in this case may be formed similarly to those used as plugged portions for a conventionally known honeycomb structure.

Further, the honeycomb structure according to the present embodiment may have a catalyst supported on at least one of the surfaces of the partition walls and the interior of the pores of the partition walls. Thus, the honeycomb structure according to the present embodiment may be structured as a catalyst support having a supported catalyst, and as a filter (for example, a diesel particulate filter (hereinafter also referred to as "DPF")) including plugged portions for purifying particulate matters (carbon fine particles) in an exhaust gas.

A type of the catalyst is not particularly limited, and it can be appropriately selected according to the use purposes and applications of the honeycomb structure. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst containing an alkaline earth metal and platinum as storage components for nitrogen oxides ($NO_x$). Illustrative examples of a catalyst that does not use the noble metal include a $NO_x$ selective catalytic reduction catalyst containing a copper-substituted or iron-substituted zeolite, and the like. A method for supporting the catalyst is not particularly limited, and it can be carried out according to a conventional method for supporting the catalyst on the honeycomb structure.

Using each of fired honeycomb structures as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment while attaching joining material adhesion preventing masks to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall.

The material of the joining material adhesion preventing mask that can be suitably used includes, but not particularly limited to, synthetic resins such as polypropylene (PP), polyethylene terephthalate (PET), polyimide, Teflon (Registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used include a pressure sensitive adhesive film having a thickness of from 20 to 50 μm.

The joining material that can be used may be prepared by, for example, mixing ceramic powder, a dispersion medium (for example, water or the like), and optionally additives such as a binder, a deflocculant and a foaming resin. The ceramics may be preferably ceramics containing at least one selected from the group consisting of cordierite, mullite, zircon, aluminum titanate, silicon carbide, silicon nitride, zirconia, spinel, indialite, sapphirine, corundum, and titania, and more preferably having the same material as that of the honeycomb structure. The binder includes polyvinyl alcohol, methyl cellulose, CMC (carboxymethyl cellulose) and the like.

Figure 2:
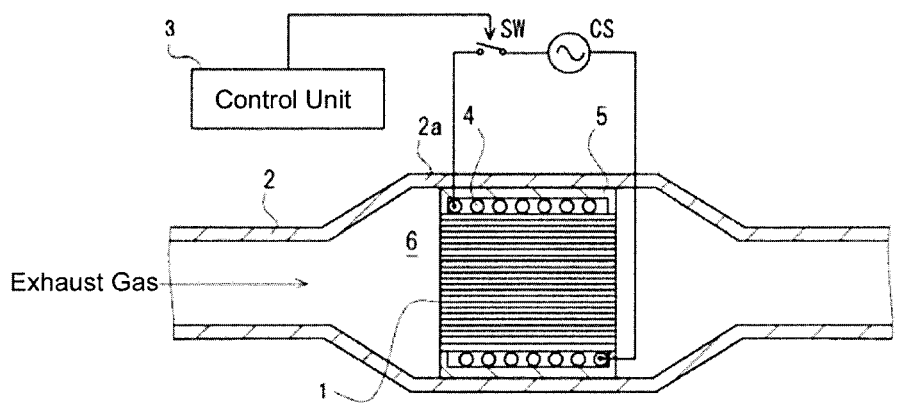
FIG. 2 is a schematic view of an exhaust gas flow path of an exhaust gas purifying device including a honeycomb structure according to an embodiment of the present invention.

FIG. 2 shows a schematic view of an exhaust gas flow path of an exhaust gas purifying device including the honeycomb structure. The flow path of the exhaust gas is defined by a metal pipe 2. An exhaust gas purifying device 6 is arranged in an increased diameter portion 2a of the metal pipe 2. The exhaust gas purifying device 6 has the honeycomb structure 1, a coil wiring 4 that spirally surrounds the outer circumference of the honeycomb structure 1, and a fixing member 5 for fixing the coil wiring 4 to the interior of the metal pipe 2. The honeycomb structure 1 may support a catalyst.

The coil wiring 4 is spirally wound around the outer circumference of the honeycomb structure 1. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver). The fixing member 5 is a heat-resistant member and is provided to fix the honeycomb structure 1 supporting the catalyst and the coil wiring 4 to the interior of the metal pipe 2.

An input power applied by the exhaust gas purifying device is preferably in a range of from 1 kW to 10 kW, in terms of heating performance. A heating frequency is preferably in a range of from 10 to 500 kHz.

In the present disclosure, a temperature of the honeycomb structure 1 is increased in response to the change of the magnetic field according to the alternating current flowing through the coil wiring 4. Based on this, carbon fine particles and the like collected by the honeycomb structure 1 are burned out. Also, when the honeycomb structure 1 supports the catalyst, the increase in the temperature of the honeycomb structure 1 raises a temperature of the catalyst supported by the catalyst support contained in the honeycomb structure 1 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

Figure 6:
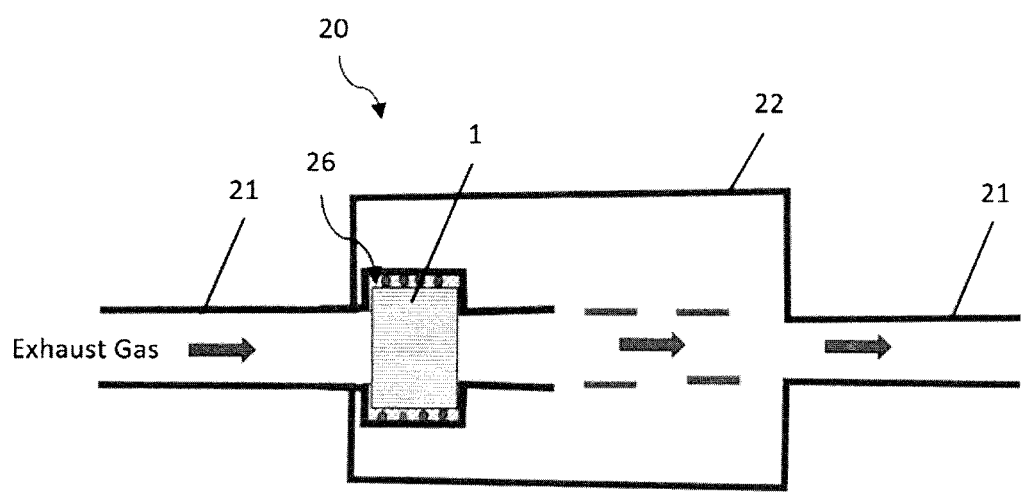
FIG. 6 is a schematic view of an exhaust system including a honeycomb structure according to an embodiment of the present invention provided in an exhaust muffler.

FIG. 6 shows a schematic view of an exhaust system 20 including an exhaust muffler 22 and the exhaust gas purifying device 26 provided in the exhaust muffler 22. The exhaust muffler 22 is provided with a silencer. The silencer may be composed of a plurality of silencers such as a main silencer and a sub silencer. The exhaust gas purifying device 26 has the honeycomb structure 1 incorporated therein, and includes the coil wiring that spirally surrounds the outer circumference of the honeycomb structure 1 and the fixing member for fixing the coil wiring to the interior of the exhaust gas flow path. The exhaust system 20 includes an exhaust pipe 21 that serves as a flow path for an exhaust gas fed to the exhaust muffler 22 or a flow path for an exhaust gas discharged from the exhaust muffler 22.

Figure 7:
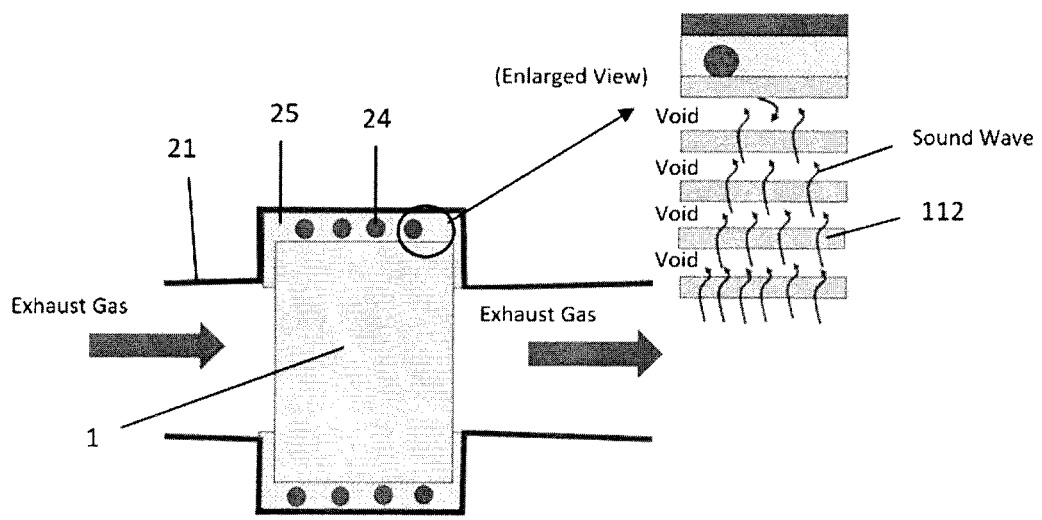
FIG. 7 is a schematic view of an exhaust gas purifying device according to an embodiment of the present invention provided in an exhaust muffler.

FIG. 7 shows a schematic view of the exhaust gas purifying device 26 provided in the exhaust muffler 22 of the exhaust system 20. FIG. 7 also shows a partially enlarged view of the vicinity of the coil wiring 24 embedded in a holding mat 25 of the exhaust gas purifying device 26, for explaining a muffling function. In the exhaust system 20, a lower temperature of a gas passing through the honeycomb structure 1 results in a lower volume flow rate of the gas, whereby a velocity of the gas passing through the partition walls of the honeycomb structure 1 can be decreased. Therefore, it is preferable to arrange the honeycomb structure 1 as downstream as possible from the exhaust system 20 in terms of ensuring a soot collection efficiency. Further, it is preferable to provide the honeycomb structure 1 inside the main silencer located at the most downstream of the exhaust system 20 and an auxiliary muffler at the previous stage of the main silencer. If a conventional honeycomb structure is mounted in the exhaust muffler, only smaller pores of the partition walls of the honeycomb structure are plugged by liquid water based on the capillary phenomenon due to condensation of water. This causes problems that the soot collection efficiency is deteriorated because the gas flowing at a high velocity is concentrated on larger pores, and that the soot cannot be regenerated because the temperature of the exhaust gas is too low. On the other hand, since the honeycomb structure 1 can evaporate and remove water by electromagnetic induction heating, the honeycomb structure 1 can maintain a higher soot collection efficiency and can be heated to a temperature required for soot regeneration during soot regeneration. Therefore, the honeycomb structure 1 is difficult to cause the problem that the soot cannot be reproduced. The honeycomb structure 1 has pressure loss factors such as expansion and contraction of the gas, passage of the gas through the porous body, and passage of the gas through the cell flow paths, which have a silencing effect. Therefore, partial replacement of the muffling function in the silencer is possible. In order to enhance the effect of reducing the high frequency sound, it is further effective to confine the high frequency sound near the outer circumference of the exhaust muffler 22 and attenuate it therein, as shown in FIG. 7. As shown in FIG. 7, the cells near the outer circumference of the honeycomb structure have a structure in which both ends are plugged, so that sound waves are difficult to leak in the axial direction. As shown in the enlarged view of FIG. 7, the sound waves transmitted into the honeycomb structure 1 in the exhaust muffler 22 of the exhaust system 20 are transmitted through a gap between the partition wall 112 and the partition wall 112 of the honeycomb structure 1, and progress while being attenuated by the partition walls, and reflected by the outermost partition wall 112 in contact with the holding mat 25. Thus, the sound waves are suppressed from propagating to the outside. The honeycomb structure may have unplugged cells that are penetrated as shown in FIG. 7, or may be a wall flow type filter in which both ends are alternately plugged. From the viewpoint of silencing effect, the wall flow type filter in which both ends are alternately plugged is more preferable.

(2. Surface Layer)

Figure 3:
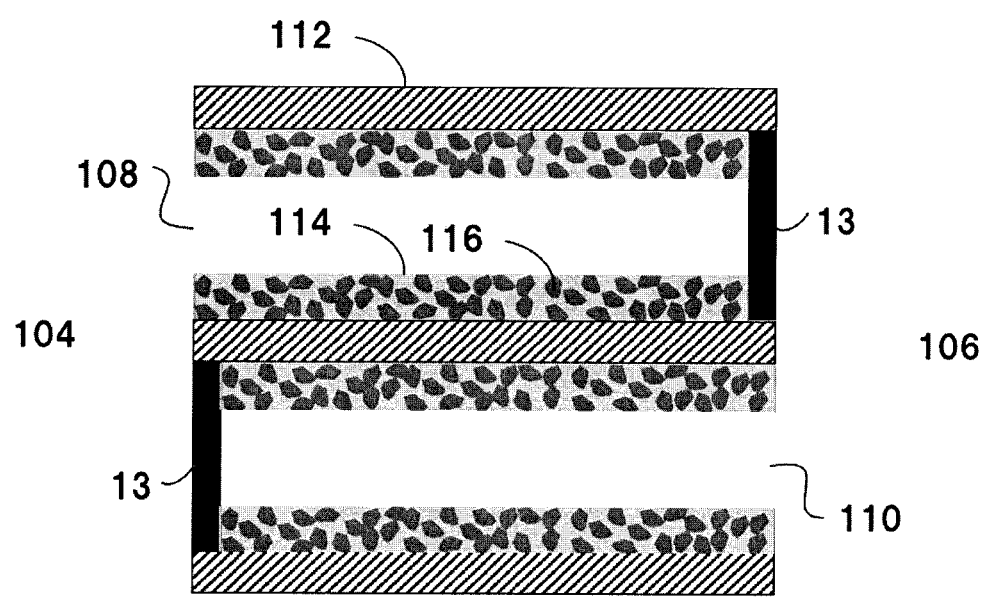
FIG. 3 is a schematic view illustrating surface layers formed on surfaces of partition walls of a honeycomb structure.

As shown in FIG. 3, the honeycomb structure 1 has surface layers 114 on at least a part of the surfaces of the partition walls 112. Each surface layer 114 contains magnetic particles 116 and has permeability.

As used herein, "permeability" means that a permeability of each surface layer is $1.0 \times 10^{-13}$ m$^2$ or more. From the viewpoint of further reducing the pressure loss, the permeability is preferably $1.0 \times 10^{-12}$ m$^2$ or more. Since each surface layer has the permeability, the pressure loss caused by the surface layers can be suppressed.

Further, as used herein, the "permeability" refers to a physical property value calculated by the following equation (1), which value is an index indicating passing resistance when a certain gas passes through the object (partition walls). Here, in the following equation (1), C represents a permeability (m$^2$), F represents a gas flow rate (cm$^3$/s), T represents a thickness of a sample (cm), V represents a gas viscosity (dynes·sec/cm$^2$), D represents a diameter of a sample (cm), P represents a gas pressure (PSI). The numerical values in the following equation (1) are: 13.839 (PSI)=1 (atm) and 68947.6 (dynes·sec/cm$^2$)=1 (PSI).

[Equation 1]

$$C = \frac{8FTV}{\pi D^2 (P^3 - 13.839^2)/13.839 \times 68947.6} \times 10^{-4} \quad (1)$$

When measuring the permeability, the partition walls with the surface layers are cut out, the permeability is measured on the partition walls with the surface layers, and the permeability is then measured on the partition walls from which the surface layers have been removed. From a ratio of thicknesses of the surface layer and the partition wall and the measurement results of the permeabilities of them, the permeability of the surface layer is calculated.

Since each surface layer 114 contains the magnetic particles 116, the honeycomb structure 1 is heated by electromagnetic induction. Therefore, it is not necessary to pass electricity through the honeycomb structure 1 itself, and the generation of short circuit can be suppressed even in an environment where condensed water is generated. The short circuit due to carbon deposition can also be suppressed. In order to obtain this effect, it is necessary to provide the surface layer 114 on at least a part of the surfaces of the partition walls 112 of the honeycomb structure 1. Although both sides of the partition wall 112 are covered with the surface layers 114 in FIG. 3, it is not always necessary to form the surface layers 114 on both sides. For example, the surface layers 114 may be formed only on the surfaces on which the first cells 108 or the second cells 110 are formed. That is, the surface layers 114 preferably cover at least one side of the partition walls 112.

The surface layers 114 containing the magnetic particles 116 may be provided only in portions where the soot regeneration effect is most likely to be exhibited. For example, more initial soot deposition of general gasoline particulates occurs near an outlet of the honeycomb structure 1. Therefore, the surface layers 114 may be provided only on the downstream side region of the honeycomb structure 1. According to such a configuration, only the portion where a large amount of soot is accumulated is heated, so that the soot can be efficiently burned out and the power consumption can be suppressed. In particular, it is suitable to regenerate the soot in a situation where the gas does not flow through the honeycomb structure 1, such as a situation where the vehicle is stopped. Further, in order to efficiently burn out the soot even if the gas is flowing through the honeycomb structure 1, the surface layers 114 may be provided only at the central portion in the gas flow direction (the axial direction of the honeycomb structure 1). By heating the central portion in the gas flow direction, the soot in the downstream region of the honeycomb structure 1 having a larger amount of accumulated soot can be effectively burned out by utilizing the effect of heat transfer by the gas.

The magnetic particles 116 are preferably formed of a magnetic material having a curie temperature. The curie temperature of the magnetic particles 116 is preferably more than 450° C., and more preferably 800° C. or more, although not particularly limited thereto. The curie temperature of the magnetic particles 116 of more than 450° C. can allow a honeycomb temperature sufficient to raise the catalyst temperature above a catalytic activity temperature to be reached. A composition of each magnetic particle 116 having a curie temperature of more than 450° C. includes, for example, Cr18% Fe (stainless steel having 18% by mass of Cr); Fe; a Fe—Cr—Al alloy; a Fe—Cr—Si alloy; a Fe—Si—Ti alloy;

a Co—Fe alloy; a Co—Fe—V alloy; a Co—Ni—Fe alloy; a Fe—Co—Nb alloy; a Fe—Co—Cr alloy; a Fe—Co—Cr—Mo alloy; a Fe—Co—Cr—Mo—Al alloy; FeOFe$_2$O$_3$; NiOFe$_2$O$_3$; CuOFe$_2$O$_3$; MgOFe$_2$O$_3$; MnBi; Ni; MnSb; MnOFe$_2$O$_3$; Y$_3$Fe$_5$O$_{12}$; and the like. The magnetic particles having a curie temperature of 800° C. or more include a Co—Fe alloy; a Co—Fe—V alloy; a Co—Ni—Fe alloy; a Fe—Co—Nb alloy; a Fe—Co—Cr alloy; a Fe—Co—Cr—Mo alloy; a Fe—Co—Cr—Mo—Al alloy; and the like. Specific compositions include balance Co—20% by mass Fe; balance Co—25% by mass Ni—4% by mass Fe; balance Fe—15—35% by mass Co; balance Fe—17% by mass Co—2% by mass Cr—1% by mass Mo; balance Fe—49% by mass Co—2% by mass V; balance Fe—18% by mass Co—10% by mass Cr—2% by mass Mo—1% by mass Al; balance Fe—27% by mass Co—1% by mass Nb; balance Fe—20% by mass Co—1% by mass Cr—2% by mass V; balance Fe—35% by mass Co—1% by mass Cr; pure cobalt; pure iron; electromagnetic soft iron; balance Fe—0.1—0.5% by mass Mn; and the like. It is desirable to use a metal including Co, which has a higher curie temperature.

Each surface layer 114 preferably has a porosity of 50% or more, and more preferably 60% or more, and still more preferably 70% or more. By having the porosity of 50% or more, the pressure loss can be suppressed. However, if the porosity is too high, the surface layers become brittle and easily peels off. Therefore, the porosity is preferably 90% or less.

As a method of measuring the porosity of the surface layers 114 by the mercury press-in method, a difference between a mercury porosity curve of the substrate on which the surface layer is formed and a mercury porosity curve of only the substrate from which the surface layers have been scrapped off and removed is determined to be a mercury porosity curve of the surface layer, and the porosity of the surface layers is calculated from the mass of the scraped surface layers and the mercury porosity curve. A SEM image may be taken, and the porosity of the surface layers may be calculated from an area ratio of the void portions and the solid portions by image analysis of the surface layer portions.

Each surface layer 114 preferably has an average pore diameter of 10 μm or less, and more preferably 5 μm or less, and further preferably 4 μm or less, and particularly preferably 3 μm or less. The average pore diameter of 10 μm or less can achieve a higher particle collection efficiency. However, if the average pore diameter of each surface layer 114 is too low, the pressure loss will increase. Therefore, the average pore diameter is preferably 0.5 μm or more.

As a method of measuring the average pore diameter of the surface layers 114 by the mercury press-in method, in the form of peak values in the mercury porosimeter, a difference between a mercury porosity curve (pore volume frequency) on the substrate in which the surface layers are formed and a mercury porosity curve on only the substrate from which only the surface layers 114 have been scrapped off and removed is determined to be a mercury porosity curve of the surface layers, and its peak is determined to be the average pore diameter. Further, an SEM image of the cross section of the honeycomb structure may be taken, and the surface layer portion may be subject to image analysis to binarize the void portions and the solid portions, and twenty or more voids may be randomly selected to average the inscribed circles, and the average may be determined to be the average pore diameter.

The magnetic particles 116 in the surface layers 114 preferably have a weight average particle diameter of 20 μm or less. The weight average particle diameter of 20 μm or less can allow the average pore diameter, thickness, and porosity of the target surface layers to be within satisfactory ranges, in combination with other controllable design factors. Although any lower limit of the weight average particle diameter of the magnetic particles 116 is not particularly set, it can be, for example, 0.5 μm or more. It is to understand that the weight average particle diameter is measured by a laser diffraction type particle size distribution measuring device.

Further, although FIG. 3 appears that each surface layer 114 and each partition wall 112 have the substantially same thickness, the thickness of each surface layer 114 is not particularly limited. However, in order to obtain the effect of the surface layers 114 more remarkably, the thickness of each surface layer 114 is preferably 10 μm or more. On the other hand, from the viewpoint of avoiding an increase in pressure loss, the thickness of each surface layer 114 is preferably 80 μm or less. The thickness of each surface layer 114 is more preferably 50 μm or less. For a method of measuring the thickness of each surface layer, for example, the honeycomb structure on which the surface layers are formed is cut in a direction perpendicular to the cell extending direction, and the thickness of each surface layer is measured from the cross section of the honeycomb structure, and the measured thicknesses at arbitrary five points can be averaged.

Further, the magnetic particles preferably have a shortest diameter d of the magnetic particles 116 of from 0.1 to 5 μm, and more preferably L/d≥3 in which L (μm) is the longest diameter of the magnetic particles 116. This can allow sufficient permeability to be ensured while maintaining electrical conductivity, and a microstructure of each surface layer having a higher soot collection efficiency to be ensured. The shortest diameter d is obtained by performing image analysis of the SEM captured image and determining a maximum line segment among line segments orthogonal to the longest diameter of 50 particles to be the shortest diameter of the particles, which is averaged by the number of particles. The longest diameter L is obtained by averaging the longest diameters of 50 or more particles by the number of particles in the SEM image. Preferably, the magnetic particles 116 are needle-shaped or scale-shaped. The needle-shaped refers to a ratio L/d≥5. The scale-shaped refers to a ratio L/t>5, which ratio is the longest diameter to a thickness t of the magnetic particles 116. The thickness t of the magnetic particles 116 is obtained by measuring the thickness of a portion having the largest particle thickness for 50 particles by image analysis of the SEM image and averaging this by the number of particles.

It is preferable to provide a stress relaxation layer between the surface layer 114 and the partition wall 112, which has a thermal expansion coefficient between thermal expansion coefficients of the surface layer 114 and the partition wall 112. This can suppress cracking and the like due to the difference between the thermal expansion coefficients of the surface layer 114 and the partition wall 112, so that the thermal shock resistance can be improved. A composition of the stress relaxation layer is not particularly limited. For example, a low expansion glass layer, an alumina layer, a silica layer, and a ceria layer can be preferably used.

(3. Method for Producing Honeycomb Structure)

The method for producing the honeycomb structure will be described below.

First, the honeycomb structure having the porous partition walls and the plurality of cells defined by the partition walls is produced. For example, when producing the honeycomb structure made of cordierite, a cordierite-forming raw material is firstly prepared. The cordierite-forming raw material contains a silica source component, a magnesia source component, and an alumina source component, and the like, in order to formulate each component so as to have a theoretical composition of cordierite. Among them, the silica source component that can be used includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used include at least one metal selected from the group consisting of iron, copper, zinc, lead, aluminum, and nickel, alloys mainly based on those metals (e.g., carbon steel or cast iron for iron, stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a lozenge shape, a konpeito shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Subsequently, a raw material for the plugged portions is prepared. The material for the plugged portions (plugging slurry) may use the same material for a green body as that of the partition walls (honeycomb dried body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like.

Subsequently, masks are applied onto some of cell opening portions on one end face of the honeycomb dried body, and the end face is immersed in a storage container in which the plugging slurry is stored to fill the non-masked cells with the plugging slurry. Similarly, masks are applied onto some of cell opening portions on the other end face of the honeycomb dried body, and the end face is immersed in a storage container in which the plugging slurry is stored to fill the non-masked cells with the plugging slurry. It is then dried and fired to obtain a honeycomb structure having plugged portions. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

Further, when the resulting honeycomb structure is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material.

When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Further, when the opening portions of the cells of the honeycomb structure are not plugged in advance, plugging may be performed in the opening portions of the cells after forming the outer peripheral coating.

Furthermore, the silicon carbide powder contained in the coating material develops color by irradiating the outer peripheral surface of the resulting honeycomb structure with laser. Therefore, product information or the like may be printed (marked) on the outer peripheral coating of the resulting honeycomb structure by irradiating it with laser light.

Preferred examples of laser light used for marking with laser include carbon dioxide gas ($CO_2$) laser, YAG laser and YVO4 laser. Laser conditions for irradiation with the laser light can be appropriately selected according to the type of the laser to be used. For example, when the $CO_2$ laser is used, the marking is preferably carried out at an output of from 15 to 25 W and a scan speed of from 400 to 600 mm/s. Such a marking method allows the irradiated portion to develop color so as to present dark color such as black to green, resulting in very good contrast due to color development to the non-irradiated portion.

When supporting the catalyst on the honeycomb structure, the printed portion is not deteriorated even after printing with the laser, and the printed portion can be read well even after supporting the catalyst. The method for supporting the catalyst is not particularly limited and can be carried out according to the method for supporting the catalyst carried out in the conventional method for producing the honeycomb structure.

The surface layer containing magnetic particles and having permeability is formed on at least a part of the surfaces of the partition walls of the honeycomb structure. Further, as described above, the surface layer covers at least one surface of each partition wall. There are mainly three methods for forming the surface layer, as follows:

a method of pouring a slurry containing magnetic particles and a binding material based on a metal or glass into the cells of the honeycomb structure to form coated films, and heating the coated films at a temperature equal to or higher than a melting point of the metal or a softening point of the glass to form the surface layers;

a method of pouring a slurry containing magnetic particles and an adhesive material based on silica or alumina into the cells of the honeycomb structure to form coated films, and heating the coated films to solidify silica or alumina to form the surface layers; and a method of allowing a gas containing magnetic particles and the binding agent or the adhesive material to flow into the cells of the honeycomb structure, or allowing a gas containing only the magnetic particles to flow into the cells of the honeycomb structure to form coated films, and heating the coated films to form the surface layers.

In order to pour the slurry into the cells of the honeycomb structure, for example, the slurry may be circulated in the cells of the honeycomb structure, or the cells of the honeycomb structure are immersed in the slurry. Here, when the binding material based on the metal or glass is used, it is necessary to melt or soften the honeycomb substrate once at a temperature equal to or lower than a heat resistant temperature of the honeycomb substrate during the production. Therefore, it is preferable to heat the coated films at a temperature equal to or lower than a melting point or a softening point of the binding material. Further, in the usage environment of the honeycomb structure, the maximum temperature reaches about 700° C. Therefore, it is more preferable to use a metal or glass having a melting point or a softening point equal to or higher than that temperature. The specific melting point or softening point is, for example, from 800 to 1200° C. On the other hand, when the adhesive material based on silica or alumina is used, it is preferable that the adhesive material can be solidified by heating and drying during production. Examples of the adhesive material that can be solidified by heating and drying include a colloidal dispersion of silica or alumina, and may be a colloidal dispersion containing silica and alumina.

Further, since the maximum temperature in the usage environment of the honeycomb structure reaches about 700° C., it is more preferable to use silica or alumina having a heat resistant temperature equal to or higher than that temperature. After pouring the slurry into the cells of the honeycomb structure, a suction jig is attached to a downstream side of the honeycomb structure, and suction is performed from the other opening end side downstream of the honeycomb structure to remove excess water to form the coated films. The coated films are preferably heated under conditions of a temperature of 800 to 1200° C. for 0.5 to 3 hours.

When the adhesive material based on alumina or silica is used, the step of pouring the slurry into the cells may be performed at the stages of honeycomb formed body and the honeycomb dried body. In this case, after pouring the slurry into the cells, the honeycomb structure before forming the surface layers is dried, and then, in the firing step of the honeycomb structure, the magnetic particles are fixed to the adhesive material to form the surface layers at the same time. The silica or alumina preferably exhibits the solidifying effect by drying.

In addition to addition of the binding material based on the metal or glass, the magnetic particles may be previously coated with the binding material based on the metal or glass.

Further, a step of forming composite particles containing magnetic particles and a binding material may be provided.

The slurry can be obtained, for example, by mixing the magnetic particles, the adhesive material or the binding material, the organic binder, and water or alcohol. Further, an oil and fat, and a surfactant may be further added to the slurry, mixed and emulsified. Also, the slurry may be mixed with a pore former for controlling the porosity of the surface layer. Examples of the pore former that can be used include resin particles, starch particles, and carbon particles, which have a particle diameter of from 0.5 μm to 10 μm, and the like.

To allow the gas containing the magnetic particles and the binding material or the adhesive material to flow into the cells of the honeycomb structure, for example, the gas containing the magnetic particles is blown in the cells at a rate of 0.005 to 0.4 liter/cm², thereby depositing the floating magnetic particles onto the surfaces of the partition walls. Subsequently, for example, a heating treatment is carried out under conditions of 800 to 1200° C. for 0.5 to 3 hours, thereby fusing the magnetic particles and fixing them to the surfaces of the partition walls to form the surface layers. When the gas containing only magnetic particles is allowed to flow into the cells of the honeycomb structure, for example, the gas containing the magnetic particles is blown into the cells at a rate of 0.005 to 0.4 liter/cm² to deposit the floating magnetic particles onto the surfaces of the partition walls, and a heat treatment is then carried out at 1280 to 1330° C. for 0.5 to 3 hours to fuse the magnetic particles to the surfaces of the partition walls and fix them to form the surface layers.

In the above methods of pouring the slurry or the gas into the cells of the honeycomb structure, including the method of pouring only the magnetic particles into the cells without using the binding material and the adhesive material, the organic binder may be mixed with the slurry or the gas. By adding the organic binder, the coated films can be temporarily fixed at a stage prior to the step of forming the surface layers by heating. A preferable organic binder includes a material that will be oxidatively removed in an oxidizing atmosphere at a temperature equal to or lower than that of the step of forming the surface layers by heating, i.e., at 800° C. or lower. It is also preferable to use a binder similar to that used as the pore former when producing the honeycomb structure.

EXAMPLES

Hereinafter, the present invention will be specifically described based on Examples. However, the present invention is not limited to Examples.
(Production of Honeycomb Structure)
[Production of Plugged Honeycomb Structure]

Alumina, aluminum hydroxide, kaolin, talc, and silica were used as the cordierite-forming raw materials. To 100 parts by mass of the cordierite-forming raw materials were added 13 parts by mass of pore former, 35 parts by mass of dispersion medium, 6 parts of organic binder, and 0.5 parts by mass of dispersant, and mixed and kneaded to form a green body.

Water was used as the dispersion medium, coke having an average particle diameter of 10 μm was used as the pore former, hydroxypropyl methylcellulose was used as the organic binder, and ethylene glycol was used as the dispersant. The green body was subjected to the extrusion molding using a predetermined mold to obtain a honeycomb formed body having a quadrangular cell shape and the entire circular pillar (cylindrical) shape.

The honeycomb formed body was then dried by a microwave dryer, and further dried completely by a hot air dryer. Both end faces were then cut and adjusted to a predetermined size to obtain a honeycomb dried body. Subsequently, masks were alternately applied onto the cell opening portions on one end face of the honeycomb dried body so as to form a checkered pattern, and the end on the masked side was immersed in a plugging slurry containing the cordierite-forming raw materials to form plugged portions alternately arranged in the checkered pattern. For the other end, masks were applied onto the cells that were plugged at the one end, and plugged portions were formed in the same manner as that for forming the plugged portions at the one end. It was then dried in a hot air dryer and further fired at 1410 to 1440° C. for 5 hours to obtain a plugged honeycomb structure (honeycomb support).

Example 1

Powder obtained by mixing magnetic particles, resin particles having a weight average particle diameter of 3 μm, and glass based on silica having a weight average particle diameter of 5 μm as a binding material at a mass ratio of 80:10:10 was prepared. For the honeycomb structure produced by the above procedure, from one end face side of the honeycomb structure, the powder was pneumatically circulated through the honeycomb structure, and deposited on surfaces of the partition walls to form coated films. The coated films were heated in the air atmosphere at 950° C. for 1 hr so as to reach a temperature equal to or higher than the softening point of the glass to burn off the resin particles, and to melt the glass based on silica to fix the particles onto the partition surfaces to form surface layers.

Example 2

A needle-shaped magnetic material having a length L of 10 μm and a ratio L/d of 1.00, an adhesive material based on silica solidified by drying as an adhesive material, an organic binder, and water were mixed at a mass ratio of 85:10:5:500 to obtain a slurry. The slurry was atomized by spraying and sucked with air from the end of the honeycomb structure to deposit it onto the partition surfaces, which was dried to form coated films. Subsequently, the organic binder was burned off by a heat treatment in the air atmosphere at 600° C. for 1 hr, and silica or alumina was solidified by a heat treatment in the air atmosphere at 1000° C. for 1 hr to form surface layers.

Example 3

A needle-shaped magnetic material having a length L of 20 μm and a ratio L/d of 4.00, an adhesive material based on silica solidified by drying as an adhesive material, an organic binder, water, oil and fat, and a surfactant were mixed at a mass ratio of 85:10:5:500:10:2 to obtain an emulsified raw material. The emulsified raw material was atomized by spraying and sucked with air from the end of the honeycomb structure to deposit it onto the partition surfaces, which was dried to form coated films. Subsequently, the organic binder was burned off by a heat treatment in the air atmosphere at 600° C. for 1 hr, and silica or alumina was solidified by a heat treatment in the air atmosphere at 1000° C. for 1 hr to form surface layers.

Example 4

One opening end which was an inlet end face of the honeycomb structure was laid up, and a slurry pool for storing a slurry was attached to the upper portion of the one opening end, and a surface layer forming slurry (glass powder based on magnetic particles as an aggregate, and $SiO_2$, $Al_2O_3$, and MgO as binding particles) was placed in the slurry pool. The slurry was impregnated into the honeycomb structure, and then sucked from the other opening end side downstream of the honeycomb structure to remove excess water and form coated films. The coated films were then dried and bonded at 950° C. as a temperature equal to or higher than the softening point of the glass powder to form surface layers.

Example 5

In 95 parts by mass of water, 0.5 parts by mass of carboxymethyl cellulose, the organic binder, was dissolved. To the resulting aqueous solution were added 2.5% parts by mass of magnetic particles (stainless steel having 18% by mass of Cr) having a shortest diameter d of 10 μm and a longest diameter L of 10 μm, which were aggregate powders, and 5 parts by mass of a glass powder colloidal dispersion (a solid content of 40%) based on $SiO_2$, $Al_2O_3$ and MgO as a binding material in this order, and stirred to obtain a surface layer forming slurry. Subsequently, in the surface layer forming slurry, the honeycomb structure was immersed while laying the inlet side down and leaving only the depth of the outlet plugging material, and then lifted up to form coated films. As a result, the slurry was dip-coated onto the inner surfaces of the inlet opening cells. After drying, the coated films were heated at 900° C. as a temperature equal to or higher than the softening point of the glass powder for 0.5 hours to form surface layers.

Example 6

Magnetic particles having a longest diameter L of 10 μm were fed to the honeycomb structure together with air, a pore former, and glass powder based on silica as a binding material, and these were deposited onto the partition walls to form coated films. At this time, the porosity and the average pore diameter of the surface layers can be controlled by appropriately setting conditions such as the particle diameter and particle size distribution of the pore former, the addition amounts, and the amount of fed air. Herein, starch was used as the pore former. Further, an alcohol, water or a resin can be contained in the partition wall portions of a certain region such as an upstream region or a downstream region of the honeycomb structure to increase permeation resistance of air, thereby controlling a deposition area of the fed surface layer forming raw material or the pore former. For example, the amount of the pore former added was 3 parts by mass to 45 parts by mass, the median diameter D50 of the pore former agent was 0.7 μm to 8.0 μm, a sharpness index as the particle size distribution of the pore former was 0.4 to 1.9, or a flow rate of the fluid was 2000 to 8000 L/min, whereby the values such as the porosity and the average pore diameter of the surface layers were changed. The coated films were heated in the air atmosphere at 950° C. as a temperature equal to or higher than the softening point of the glass powder for 1 hr to form surface layers.

Examples 7 and 8

Surface layers were formed on the honeycomb structures in the same procedure as that of Example 6, with the exception that the magnetic particles having the longest diameter L and the shortest diameter d as shown in Table 1 were used.

Example 9

Surface layers were formed on the honeycomb structure in the same procedure as that of Example 1, with the exception that the magnetic particles having the composition as shown in Table 1 were used.

Examples 10, 11, 12, 13, 14

Surface layers were formed on the honeycomb structures in the same procedure as that of Example 6, with the exception that scale-shaped magnetic particles having the longest diameter L and the shortest diameter d as shown in Table 1 were used.

Characteristics of the honeycomb structures obtained by Examples are shown in Table 1.

TABLE 1

| | Magnetic Particles | | | | | | Surface Layer | | |
|---|---|---|---|---|---|---|---|---|---|
| Examples | Composition | Curie Temperature (° C.) | Weight Average Particle Diameter (μm) | Shortest Diameter d (μm) | Longest Diameter L (μm) | L/D | Thickness (μm) | Porosity (%) | Average Pore Diameter (μm) |
| 1 | $MgOFe_2O_3$ | 713 | 10 | 10 | 10 | 1.00 | 8 | 60 | 5.0 |
| 2 | $MgOFe_2O_3$ | 713 | 10 | 10 | 10 | 1.00 | 25 | 65 | 3.2 |
| 3 | $MgOFe_2O_3$ | 713 | 20 | 5 | 20 | 4.00 | 18 | 65 | 2.2 |
| 4 | $MgOFe_2O_3$ | 713 | 20 | 3 | 30 | 10.00 | 19 | 50 | 2.0 |
| 5 | Cr18%Fe | 670 | 10 | 10 | 10 | 1.00 | 25 | 55 | 4.8 |
| 6 | Cr18%Fe | 670 | 15 | 10 | 10 | 1.00 | 20 | 65 | 4.0 |
| 7 | Cr18%Fe | 670 | 18 | 6 | 20 | 3.33 | 30 | 70 | 2.9 |
| 8 | Cr18%Fe | 670 | 20 | 2 | 30 | 15.00 | 31 | 60 | 2.5 |
| 9 | $CrO_2$ | 386 | 10 | 10 | 10 | 1.00 | 15 | 55 | 5.0 |
| 10 | Co70%Ni25%Fe4% | 1000 | 20 | 3 | 30 | 10.00 | 30 | 60 | 3.0 |
| 11 | Co80%Fe20% | 1030 | 20 | 2 | 20 | 10.00 | 25 | 60 | 2.5 |
| 12 | Co49%Fe49%V2% | 950 | 18 | 10 | 10 | 1.00 | 20 | 55 | 3.0 |
| 13 | Co17%Cr2%Mo1%Fe | 920 | 18 | 2 | 20 | 10.00 | 25 | 60 | 2.5 |
| 14 | Co18%Cr10%Mo2%Al1%Fe | 800 | 20 | 3 | 30 | 10.00 | 30 | 55 | 2.5 |

The honeycomb structure of Example 7 was subjected to a heating test with an induction heating device. The heating performance of the honeycomb structure was compared at an input power of 4 kW, and at induction heating frequencies of 30 kHz, 85 kHz, and 350 kHz. When the induction heating frequencies were 30 kHz and 85 kHz, a coil was wound around the outer circumference of the honeycomb structure by 6 rounds, and when the induction heating frequency was 350 kHz, the coil was wound around the outer circumference of the honeycomb structure by 3 rounds. An unloaded inductance of the coil used at 30 kHz and 85 kHz is 2.5 pH, and the unloaded inductance of the coil used at 350 kHz is 1.0 µH. For a capacitor combined with the coil, capacitors having a capacitance of 10 µF for the test at 30 kHz, a capacitance of 1.3 µF for 85 kHz, and a capacitance of 0.2 µF for 350 kHz were selected. For a transformer, a ratio of the number of turns of 20:1 was used for the tests at 30 kHz and 85 kHz, and the ratio of 7:1 was used for the test at 350 kHz.

Figure 4:
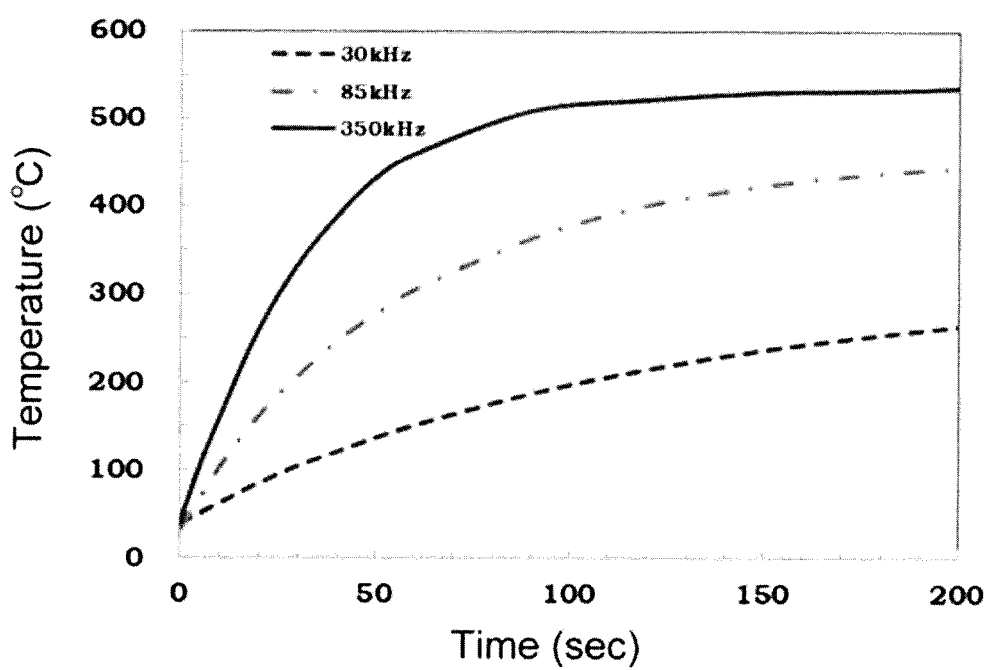
FIG. 4 is a graph illustrating a relationship between times (seconds) and temperatures (° C.) at each induction heating frequency of 30 kHz, 85 kHz, and 350 kHz in a heating test of Example 7.

It was confirmed that a sufficient heating rate could not be obtained when the induction heating frequency was 30 kHz, but it was heated to 500° C. in 90 seconds at 350 kHz. FIG. 4 shows a graph illustrating the relationship between times (seconds) and temperatures (° C.) at each induction heating frequency of 30 kHz, 85 kHz, and 350 kHz in the heating test.

Figure 5:
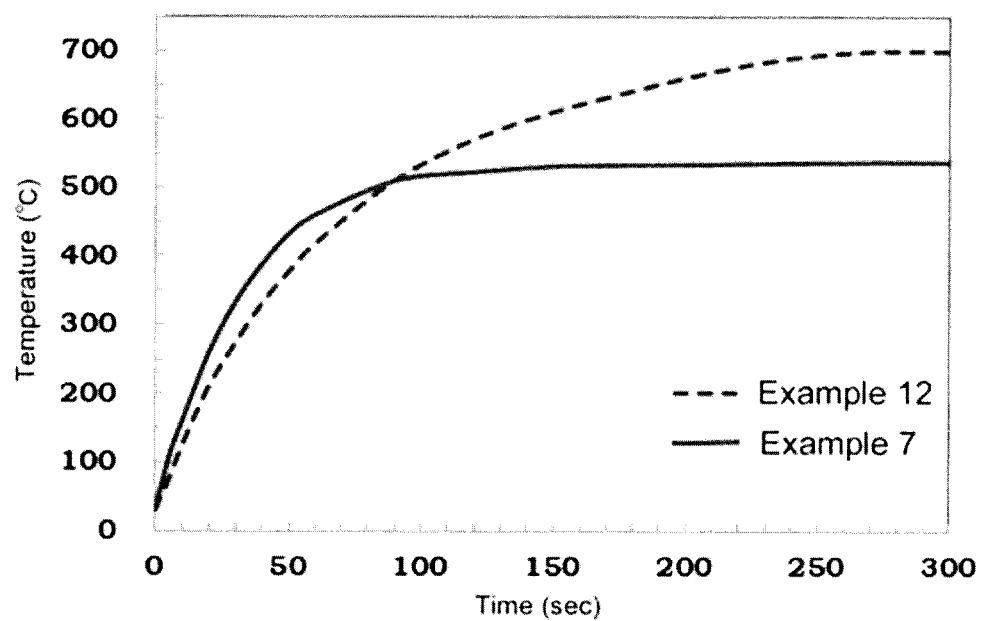
FIG. 5 is a graph illustrating a relationship between times (seconds) and temperatures (° C.) in heating tests of Examples 7 and 12.

The honeycomb structure of Example 12 was similarly subjected to a heating test with an induction heating device. The heating performance of the honeycomb structure was compared with that of Example 7 at an input power of 4 kW and at induction heating frequency of 350 kHz. The combination of the coil, the capacitor, and the transformer in the 350 kHz induction heating test according to Example 12 is the same as that of Example 7. FIG. 5 shows a graph illustrating the relationship between times (seconds) and temperatures (° C.) in the heating test.

It was confirmed that by using an alloy having a higher curie point (Fe-49Co-2V alloy), the honeycomb structure could be heated to 700° C. without the heat of oxidation of the catalyst.

All the Examples could heat the honeycomb structures by the exhaust gas purifying device as shown in FIG. 2. Further, no short circuit was generated during heating.

Based on the above teachings, one of ordinary skill in the art can make various changes to each embodiment.

DESCRIPTION OF REFERENCE NUMERALS 1 honeycomb structure
2 metal pipe
3 control unit
4, 24 coil wiring
5 fixing member
6, 26 exhaust gas purifying device
13 plugged portion
20 exhaust system
21 exhaust pipe
22 exhaust muffler
25 holding mat
102 outer peripheral wall
104 first end surface
106 second end face
108 first cell
110 second cell
112 partition wall
114 surface layer
116 magnetic particle

The invention claimed is:

1. An exhaust system comprising:
an exhaust muffler;
an exhaust gas purifying device provided in the muffler, the exhaust gas purifying device including a pillar shaped honeycomb structure comprising:
a porous partition wall that defines a plurality of cells, the cells forming flow paths for a fluid, the cells extending from an inflow end face to an outflow end face; and
an outer peripheral wall located at the outermost circumference;
wherein at least a part of surfaces of the partition wall has a surface layer,
wherein the surface layer comprises magnetic particles and has permeability; and
wherein the magnetic particles have a curie temperature of 670° C. or more;
a coil wiring that spirally surrounds an outer circumference of the pillar shaped honeycomb structure;
a fixing member for fixing the coil wiring to an interior of an exhaust gas flow path, the fixing member being positioned outside the coil wiring; and
a silencer provided in the exhaust muffler.

2. The exhaust system according to claim 1, wherein at least one surface of the partition wall is covered with the surface layer.

3. The exhaust system according to claim 1, wherein the surface layer has a porosity of 50% or more.

4. The exhaust system according to claim 1, wherein the surface layer has an average pore diameter of 10 µm or less.

5. The exhaust system according to claim 1, wherein the magnetic particles have a weight average particle diameter of 20 µm or less.

6. The exhaust system according to claim 1, wherein the surface layer has a thickness of from 10 to 80 µm.

7. The exhaust system according to claim 1, wherein the pillar shaped honeycomb structure is formed of a ceramic material.

8. The exhaust system according to claim 7, wherein the ceramic material is at least one selected from the group consisting of cordierite, silicon carbide, aluminum titanate, silicon nitride, mullite, and alumina.

9. The exhaust system according to claim 1, wherein the magnetic particles have a shortest diameter d of from 0.1 to 5 µm, and satisfy L/d≥3, in which L (µm) is a longest diameter of the magnetic particles.

10. The exhaust system according to claim 9, wherein the magnetic particles are needle-shaped or scale-shaped.

11. The exhaust system according to claim 1, wherein the pillar shaped honeycomb structure comprises a stress relaxation layer between the surface layer and the partition wall, the stress relaxation layer having a thermal expansion coefficient between thermal expansion coefficients of the surface layer and the partition wall.

12. The exhaust system according to claim 1, wherein the cells comprise: a plurality of first cells which are opened on a side of inflow end face and have plugged portions at the outflow end face; and a plurality of second cells which are opened on a side of the outflow end face and have plugged portions at the inflow end face.

13. An exhaust system comprising:
an exhaust muffler;
an exhaust gas purifying device provided in the muffler, the exhaust gas purifying device including a pillar shaped honeycomb structure comprising:
a porous partition wall that defines a plurality of cells, the cells forming flow paths for a fluid, the cells extending from an inflow end face to an outflow end face; and an outer peripheral wall located at the outermost circumference;

wherein at least a part of surfaces of the partition wall has a surface layer, and wherein the surface layer comprises needle-shaped or scale-shaped magnetic particles;

a coil wiring that spirally surrounds an outer circumference of the pillar shaped honeycomb structure;

a fixing member for fixing the coil wiring to an interior of an exhaust gas flow path, the fixing member being positioned outside the coil wiring; and a silencer provided in the exhaust muffler.

14. A method for producing the pillar shaped honeycomb structure according to claim 1, comprising:

a porous partition wall that defines a plurality of cells, the cells forming flow paths for a fluid, the cells extending from an inflow end face to an outflow end face; and an outer peripheral wall located at the outermost circumference, wherein the method comprises a step of forming a surface layer in at least a part of surfaces of the partition wall, the surface layer comprising magnetic particles and having permeability.

15. The method according to claim 14, wherein the step of forming the surface layer comprising the magnetic particles and having permeability comprises covering at least one surface of the partition with the surface layer.

16. The method according to claim 14, wherein the step of forming the surface layer comprising the magnetic particles and having permeability comprises the steps of:

pouring a slurry comprising magnetic particles and a binding material based on a metal or glass into the cells to form a coated film; and heating the coated film at a temperature equal to or higher than a melting point of the metal or a softening point of the glass to form the surface layer.

17. The method according to claim 14, wherein the step of forming the surface layer comprising the magnetic particles and having permeability comprises the steps of:

pouring a slurry comprising magnetic particles and an adhesive material based on silica or alumina into the cells to form a coated film; and heating the coated film to solidify the silica or alumina to form the surface layer.

18. The method according to claim 14, wherein the step of forming the surface layer comprising the magnetic particles and having permeability comprises a step of allowing a gas comprising magnetic particles to flow into the cells.

19. The method according to claim 14, wherein the surface layer has a porosity of 50% or more.

20. The method according to claim 14, wherein the surface layer has an average pore diameter of 10 μm or less.

21. The method according to claim 14, wherein the magnetic particles have a weight average particle diameter of 20 μm or less.

22. The method according to claim 14, wherein the surface layer has a thickness of from 10 to 80 μm.

23. The method according to claim 22, wherein the pillar shaped honeycomb structure is formed of a ceramic material, and wherein the ceramic material is at least one selected from the group consisting of cordierite, silicon carbide, aluminum titanate, silicon nitride, mullite, and alumina.

24. The method according to claim 14, wherein the magnetic particles have a shortest diameter d of from 0.1 to 5 μm, and satisfy L/d≥3, in which L (μm) is a longest diameter of the magnetic particles.

25. The method according to claim 23, wherein the magnetic particles are needle-shaped or scale-shaped.

* * * * *